Patented May 13, 1924.

1,493,847

UNITED STATES PATENT OFFICE.

EUGENE DONATH, OF BRATISLAVA, CZECHOSLOVAKIA.

PROCESS OF PREPARATION OF A THERAPEUTIC ACTING COLLOID SOLUBLE OR COLLOIDLIKE DIVIDED LIME COMBINATION.

No Drawing.   Application filed December 30, 1922.   Serial No. 610,003.

*To all whom it may concern:*

Be it known that I, EUGENE DONATH, citizen of the Republic of Czechoslovakia, residing at Dobrovits ul. 14 Bratislava, Czechoslovakia, have invented new and useful Improvements in Process of Preparation of a Therapeutic Acting Colloid Soluble or Colloidlike Divided Lime Combination, of which the following is a specification.

I have discovered that colloid or colloidlike divided carbonate of lime if same is supplied with a coating of phosphate, is physiologically more effective than the known colloid carbonate of lime or common carbonate of lime, phosphate of lime in itself.

The process of production of the new preparation consists in this that a water-soluble lime-combination is dissolved in water in the presence of colloid or colloidlike solutions, suspensions, or decoctions of linseed, agar-agar, carragheen, sea-weed, gum-arabic, tragacanth, amylodextrine or carbohydrate containing amylodextrine, caramel, glue or gelatin or mixtures of these and is precipitated with a water soluble inorganic carbonate or hydrocarbonate. The quantity of means of the precipitation is exactly to be applied according to the salification that is the double conversion. The precipitation may be executed cold or warm. After resulted precipitation the mass containing the colloidal divided carbonate of lime will be mixed with an aqueous solution of a water soluble sulphate or phosphate, whereas it is not to add of the latter as much as the complete conversion of carbonate into phosphate would require.

Dry products can be obtained by carefully evaporating either with or without vacuum.

Example.

1 mol. calcium chloride will be dissolved in water in the presence of caramel and amylodextrine and precipitated with an aqueous solution of 1 mol. sodium carbonate. After resulted precipitation an aqueous solution of sodium phosphate according to $\frac{1}{2}$ mol. will be added. In order to get a dry product the obtained solution must be evaporated.

What I claim as my invention and desire to secure by Letters Patent of the United States is:

Process of production of therapeutical acting colloids of lime combination characterized by precipitating a water soluble lime combination in the presence of organic colloids by means of a water soluble inorganic carbonate and a solution of a water soluble phosphate, whereby less of the latter is used than is required for a complete conversion into calcium phosphate.

In testimony whereof I have signed my name to this specification in the presence of two subscribing witnesses.

EUGENE DONATH.

Witnesses:
CARL CONDENBURG,
W. P. TIFYNFER.